United States Patent
Ye

(10) Patent No.: US 10,448,134 B1
(45) Date of Patent: Oct. 15, 2019

(54) TWO-WIRE TYPE MICROPHONE WITH ULTRASONIC IDENTIFICATION

(71) Applicants: ZILLTEK TECHNOLOGY (SHANGHAI) CORP., Shanghai (CN); ZILLTEK TECHNOLOGY CORP., Hsinchu (TW)

(72) Inventor: Jinghua Ye, Shanghai (CN)

(73) Assignees: ZILLTEK TECHNOLOGY (SHANGHAI) CORP., Shanghai (CN); TELLTEK TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 15/991,787

(22) Filed: May 29, 2018

(30) Foreign Application Priority Data

Mar. 23, 2018 (CN) .......................... 2018 1 0247948

(51) Int. Cl.
   *H04R 3/00* (2006.01)
   *H04R 1/08* (2006.01)
   *H04B 11/00* (2006.01)

(52) U.S. Cl.
   CPC ............... *H04R 1/08* (2013.01); *H04B 11/00* (2013.01); *H04R 3/00* (2013.01); *H04R 2430/20* (2013.01)

(58) Field of Classification Search
   CPC ........ H04R 1/08; H04R 3/00; H04R 2430/20; H04B 11/00
   USPC ............................................. 381/111, 122, 74
   See application file for complete search history.

(56) References Cited

U.S. PATENT DOCUMENTS

2009/0180629 A1* 7/2009 Sander .................... H04M 1/05
                                                          381/58

* cited by examiner

*Primary Examiner* — Vivian C Chin
*Assistant Examiner* — Ammar T Hamid
(74) *Attorney, Agent, or Firm* — Levenfeld Pearlstein, LLC

(57) ABSTRACT

The invention discloses a two-wire type microphone with ultrasonic identification, comprising: an acoustic transducer for capturing an acoustic signal; a signal processing chip, connected to a signal output terminal of the acoustic transducer, wherein the signal processing chip comprises a signal output terminal pin, a ground pin and an ultrasonic generator, wherein the ultrasonic generator is the configured for generating an ultrasonic signal, and a control terminal of the ultrasonic generator is connected to the signal processing chip. The beneficial effects of the present invention includes: the ultrasonic signal generated by the ultrasonic generator is utilized to match the ultrasonic signal with the encoding unit in the signal processing chip for identification, and a remote authentication by the client is useful for matching the electronic device with the microphone. Furthermore, the signal output terminal pin and the ground pin are introduced into the microphone in the prior art, and the signal output terminal pin is also used for a communication line and a power line, thereby further saving the cost.

8 Claims, 1 Drawing Sheet

TWO-WIRE TYPE MICROPHONE WITH ULTRASONIC IDENTIFICATION

BACKGROUND OF THE INVENTION

1. Field of the Invention

The invention relates to a field of micro-electromechanical technology, and more particularly, to a two-wire type microphone with ultrasonic identification.

2. Description of the Related Art

With the development of mobile multimedia technology, electronic products tend to become miniature and integrated. Among the electronic products in the electroacoustic field, a microphone is used to convert an acoustic signal into an electrical signal. In recent years, the microphone structure is widely used in electronic devices, such as mobile phones, earphones, laptops, cameras.

With respect to the microphone in the prior art, the acoustic signal is converted into the electrical signal by a transducer first, then the electrical signal is converted by a circuit chip, finally the electronic device is accessed. When introduced into the electronic device, a conventional microphone is not equipped with a relevant matching recognition function, such that the microphone will not match the electronic device, and effective recognition cannot be made in time, causing inconvenience to a user of the product.

SUMMARY OF THE INVENTION

Aiming at the foregoing problems in the prior art, the present invention provides an ultrasonic identification circuit and a two-wire type earphone.

The technical solution is as follows:

a two-wire type microphone with ultrasonic identification, comprising:

an acoustic transducer for capturing an acoustic signal;

a signal processing chip, connected to a signal output terminal of the acoustic transducer, the signal processing chip comprising:

a signal output terminal pin;

a ground pin; and an ultrasonic generator, for generating an ultrasonic signal, wherein a control terminal of the ultrasonic generator is connected to the signal processing chip.

Preferably, the two-wire type microphone comprises a voltage/current acquisition circuit, wherein an input terminal of the voltage/current acquisition circuit is connected to the signal output terminal pin for obtaining electric energy from the signal output terminal pin and storing the electric energy, and wherein an output terminal of the voltage/current acquisition circuit is configured for outputting the electric energy.

Preferably, the two-wire type microphone further comprises a bias power supply, wherein an input terminal of the bias power supply is connected to the output terminal of the voltage/current acquisition circuit for receiving the electric energy output from the voltage/current acquisition circuit, and for outputting a working voltage from an output terminal of the bias power supply;

wherein a power supply terminal of the acoustic transducer is connected between the output terminal of the bias power supply and the ground pin.

Preferably, wherein the signal processing chip comprises:

an amplifier, wherein an input terminal of the amplifier is connected to the signal output terminal of the acoustic transducer; and a voltage follower, wherein an input terminal of the voltage follower is connected to an output terminal of the amplifier, and the output terminal of the voltage follower is connected to the signal output terminal pin.

Preferably, wherein the signal processing chip comprises an encoding unit configured to encode the ultrasonic signal and form an ultrasonic coded signal for transmission.

Preferably, wherein the ultrasonic coded signal is an ultrasonic coded signal with a set time span.

Preferably, wherein the ultrasonic coded signal comprises an identification signal.

Preferably, wherein the set time is 6 ms.

Preferably, the two-wire type microphone further comprises an encapsulation shell, wherein all of the acoustic transducer, the voltage/current acquisition circuit and the bias power supply are disposed inside the encapsulation shell, and wherein the signal output terminal pin and the ground pin extend from an interior of the encapsulation shell to an exterior of the encapsulation shell.

The beneficial effects of the present invention are as follows: by increasing the ultrasonic signal generated by the ultrasonic generator, and matching the ultrasonic signal with the encoding unit in the signal processing chip for identification, and through a remote authentication by the client, matching problem between the electronic device and the microphone is effectively solved. Also, the signal output terminal pin and the ground pin are introduced into the microphone in the prior art, and the signal output terminal pin is also used for a communication line and a power line, thereby further saving the cost.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
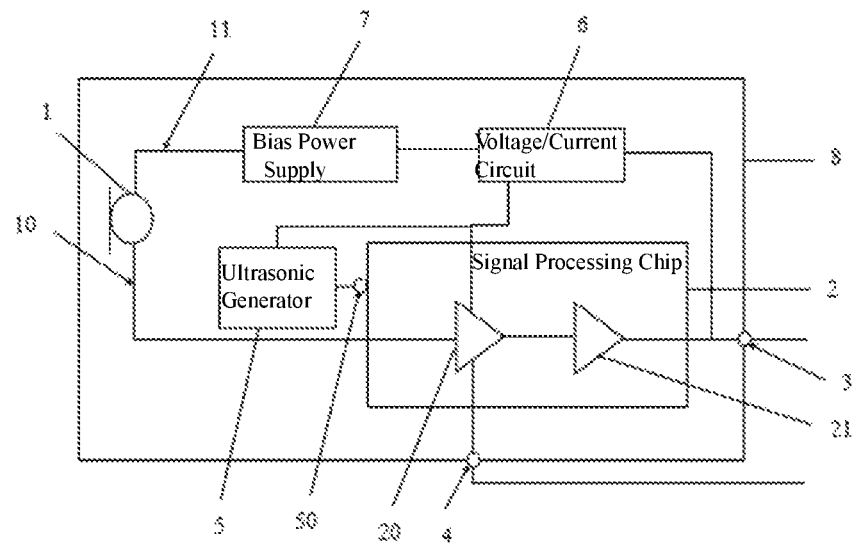
FIG. 1 is a circuit diagram of a two-wire type microphone with ultrasonic identification according to the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

The invention comprises a two-wire type microphone with ultrasonic identification, comprising:

an acoustic transducer 1 for capturing an acoustic signal;

a signal processing chip 2, connected to a signal output terminal 10 of the acoustic transducer 1, the signal processing chip 2 comprising:

a signal output terminal pin 3;

a ground pin 4; and an ultrasonic generator 5, for generating an ultrasonic signal, wherein a control terminal 50 of the ultrasonic generator 5 is connected to the signal processing chip 2.

Figure 2:
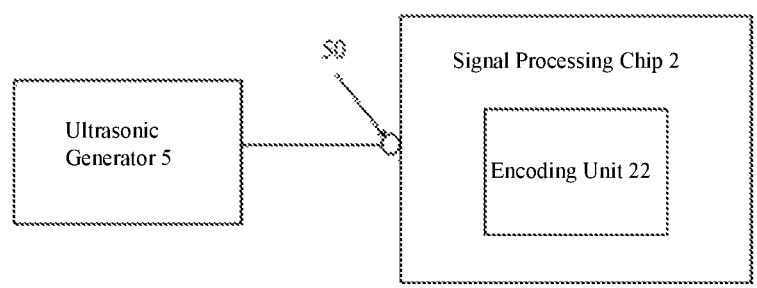
FIG. 2 is a partial enlarged view of identification of an ultrasonic generator according to the present invention.

By implementing the technical solution of the two-wire type microphone with ultrasonic identification, as show in FIGS. 1 and 2, the ultrasonic generator 5, the signal output terminal pin 3 and the ground pin 4 are additionally provided in the two-wire type microphone with ultrasonic identification based on the microphone in the prior art, and the signal output terminal pin is also used for a communication line and a power line. In addition, the two-wire type microphone further comprises the acoustic transducer 1 and the signal processing chip 2;

furthermore, as shown in FIG. 2, when the two-wire type microphone is inserted into an electronic device, a first interruption is introduced. At that point, the ultrasonic generator 5 generates an ultrasonic signal, and the ultrasonic signal is encoded by an encoding unit 22 the signal processing chip 2 to form an ultrasonic coded signal, and the ultrasonic coded signal is sent to the client;

furthermore, the client can remotely identify the ID of the electronic device, and determine that the electronic device is a licensed electronic device at the same time, then track an audio signal. In doing so, the matching problem between the electronic device and the microphone is effectively solved. At the meantime, the signal output terminal pin and the ground pin are introduced based on the microphone in the prior art, and the signal output pin is used for the communication line and the power line, which further saves the cost.

In a preferred embodiment, the two-wire type microphone comprises a voltage/current acquisition circuit 6, wherein an input terminal of the voltage/current acquisition circuit 6 is connected to the signal output terminal pin 3 for obtaining electric energy from the signal output terminal pin 3 and storing the electric energy, and wherein an output terminal of the voltage/current acquisition circuit 6 is configured for outputting the electric energy.

In a preferred embodiment, the two-wire type microphone further comprises a bias power supply 7, wherein an input terminal of the bias power supply 7 is connected to the output terminal of the voltage/current acquisition circuit 6 for receiving the electric energy output from the voltage/current acquisition circuit 6, and for outputting a working voltage from an output terminal of the bias power supply 7;

wherein a power supply terminal 11 of the acoustic transducer 1 is connected between the output terminal of the bias power supply 7 and the ground pin 4.

Specifically, as shown in FIG. 1, the two-wire type microphone with ultrasonic identification further comprises the voltage/current acquisition circuit 6 and the bias power supply 7, wherein the voltage/current acquisition circuit 6 is configured for obtaining electric energy from the signal output terminal pin 3 and storing the electric energy, and wherein an output terminal of the voltage/current acquisition circuit 6 is configured for outputting the electric energy to power the signal processing chip 2, the ultrasonic generator 5 and the bias power supply 7, respectively. In addition, the voltage/current acquisition circuit 6 further comprises a voltage reduction unit (not shown in the figures), wherein the voltage reduction unit (not shown in the figures) is configured for reducing the voltage at the signal output terminal pin 3 to the output terminal of the voltage/current acquisition circuit 6;

further, the input terminal of the bias power supply 7 is connected to the output terminal of the voltage/current acquisition circuit 6 for receiving the electric energy output from the voltage/current acquisition circuit 6, and for outputting a working voltage from the output terminal of the bias power supply 7, so as to output a bias voltage to power the acoustic transducer 1.

In a preferred embodiment, the signal processing chip 2 comprises:

an amplifier 20, wherein an input terminal of the amplifier 20 is connected to the signal output terminal 10 of the acoustic transducer 1; and a voltage follower 21, wherein an input terminal of the voltage follower 21 is connected to an output terminal of the amplifier 20, and the output terminal of the voltage follower 21 is connected to the signal output terminal pin 3.

Specifically, the signal processing chip 2 is a low-cost, integrated circuit chip, which comprises the amplifier 20 and the voltage follower 21, wherein the amplifier 20 is a general-purpose amplifier, suitable for providing a maximum of 1.0 A low-impedance line for a reactive load; and the output terminal of the voltage follower 21 is connected to the signal output terminal pin 3, and the output voltage thereof changes with the supply voltage, that is, the actual voltage is changed within a certain range to transmit a logic signal, achieving the transmission of one signal.

In a preferred embodiment, the signal processing chip 2 comprises an encoding unit 22 configured to encode the ultrasonic signal and form an ultrasonic coded signal for transmission.

In a preferred embodiment, the ultrasonic coded signal is an ultrasonic coded signal with a set time span.

In a preferred embodiment, the ultrasonic coded signal comprises an identification signal.

In a preferred embodiment, the set time is 6 ms.

Specifically, as shown in FIG. 2, when the two-wire type microphone is inserted into an electronic device, a first interruption is introduced. At that point, the ultrasonic generator 5 generates an ultrasonic signal, and the ultrasonic signal is encoded by an encoding unit 22 in the signal processing chip 2 to form an ultrasonic coded signal, and the ultrasonic coded signal can be represented as a specific frequency or specific wavelength and sent to the client;

furthermore, the client can remotely identify the ID of the electronic device, and determine that the electronic device is a licensed electronic device at the same time, then track an audio signal.

Specifically, the ultrasonic coded signal can be an ultrasonic coded signal with a set time span of 6 ms, or an identification signal. However, the ultrasonic coded signal is not limited to those two ultrasonic coded signals, which will not be described in detail herein.

In a preferred embodiment, the two-wire type microphone further comprises an encapsulation shell 8, wherein all of the acoustic transducer 1, the voltage/current acquisition circuit 6 and the bias power supply 7 are disposed inside the encapsulation shell 8, and wherein the signal output terminal pin 3 and the ground pin 4 extend from an interior of the encapsulation shell 8 to an exterior of the encapsulation shell 8.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A two-wire type microphone with ultrasonic identification, comprising:
    an acoustic transducer for capturing an acoustic signal;
    a signal processing chip connected to a signal output terminal of the acoustic transducer, wherein the signal processing chip comprises:
    a signal Output terminal pin;
    a ground pin;
    an ultrasonic generator configured for generating an ultrasonic signal, wherein a control terminal of the ultrasonic generator is connected to the signal processing chip,
    wherein the signal processing chip comprises an encoding unit configured to encode the ultrasonic signal to form an ultrasonic coded signal for transmission, and
    wherein when the two-wire type microphone is inserted into an electronic device, a first interruption is introduced the ultrasonic generator generates the ultrasonic signal, and the ultrasonic signal is encoded by the encoding unit in the signal processing chip to form the ultrasonic coded signal.

2. The two-wire type microphone as claimed in claim 1, comprising: a voltage/current acquisition circuit, wherein an input terminal of the voltage/current acquisition circuit is connected to the signal output terminal pin for obtaining electric energy from the signal output terminal pin and storing the electric energy, and wherein an output terminal of the voltage/current acquisition circuit is configured for outputting the electric energy.

3. The two-wire type microphone as claimed in claim 2, further comprising: a bias power supply, wherein an input terminal of the bias power supply is connected to the output terminal of the voltage/current acquisition circuit for receiving the electric energy output from the voltage/current acquisition circuit, and for outputting a working voltage from an output terminal of the bias power supply; and
    wherein a power supply terminal of the acoustic transducer is arranged between the output terminal of the bias power supply and the ground pin.

4. The two-wire type microphone as claimed in claim 1, wherein the signal processing chip comprises:
    an amplifier, wherein an input terminal of the amplifier is connected to the signal output terminal of the acoustic transducer; and
    a voltage follower, wherein an input terminal of the voltage follower is connected to an output terminal of the amplifier, and the output terminal of the voltage follower is connected to the signal output terminal pin.

5. The two-wire type microphone as claimed in claim 1, wherein the ultrasonic coded signal is an ultrasonic coded signal with a set time span.

6. The two-wire type microphone as claimed in claim 1, wherein the ultrasonic coded signal comprises an identification signal.

7. The two-wire type microphone as claimed in claim 5, wherein the set time span is 6 ms.

8. The two-wire type microphone as claimed in claim 3, further comprising: an encapsulation shell, wherein all of the acoustic transducer, the voltage/current acquisition circuit and the bias power supply are disposed inside the encapsulation shell, and wherein the signal output terminal pin and the ground pin extend from an interior of the encapsulation shell to an exterior thereof.

* * * * *

UNITED STATES PATENT AND TRADEMARK OFFICE
CERTIFICATE OF CORRECTION

PATENT NO. : 10,448,134 B1  
APPLICATION NO. : 15/991787  
DATED : October 15, 2019  
INVENTOR(S) : Jinghua Ye Page 1 of 1

It is certified that error appears in the above-identified patent and that said Letters Patent is hereby corrected as shown below:

On the Title Page

1. In Item (73), under "Assignee", in Column 1, Line 3, delete "TELLTEK TECHNOLOGY CORP.," and insert -- ZILLTEK TECHNOLOGY CORP., --, therefor.
2. In Item (57), under "ABSTRACT", in Column 2, Line 7, delete "is the configured" and insert -- is configured --, therefor.

In the Specification

3. In Column 3, Line 38, delete "show" and insert -- shown --, therefor.
4. In Column 3, Line 51, delete "22 the" and insert -- 22 in the --, therefor.

In the Claims

5. In Column 5, Line 37, in Claim 1, delete "Output" and insert -- output --, therefor.
6. In Columns 5 & 6, Lines 47 & 1, in Claim 1, delete "introduced" and insert -- introduced, --, therefor.

Signed and Sealed this  
Twenty-fourth Day of December, 2019

Andrei Iancu  
*Director of the United States Patent and Trademark Office*